US012293177B1

(12) United States Patent
Roberts et al.

(10) Patent No.: US 12,293,177 B1
(45) Date of Patent: May 6, 2025

(54) TECHNIQUES FOR UPLOADING NETWORK APPLICATIONS

(71) Applicant: Amazon Technologies, Inc., Seattle, WA (US)

(72) Inventors: Greg Roberts, La Jolla, CA (US); Michael Jacob Parisi Presicce, New York, NY (US); Skyler J. Brown, Irvine, CA (US); Luis Valencia, Valencia, CA (US)

(73) Assignee: Amazon Technologies, Inc., Seattle, WA (US)

( * ) Notice: Subject to any disclaimer, the term of this patent is extended or adjusted under 35 U.S.C. 154(b) by 268 days.

(21) Appl. No.: 17/850,943

(22) Filed: Jun. 27, 2022

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC .................................... G06F 8/65; G06F 8/71
See application file for complete search history.

(56) References Cited

U.S. PATENT DOCUMENTS

| 7,805,719 | B2 * | 9/2010 | O'Neill | G06F 8/658 |
| | | | | 717/168 |
| 9,244,673 | B2 * | 1/2016 | Chinn | G06F 9/44 |
| 9,626,277 | B2 * | 4/2017 | Thangamani | G06F 11/0706 |
| 10,447,780 | B2 * | 10/2019 | Calkowski | G06F 16/178 |
| 10,901,721 | B2 * | 1/2021 | Mukhopadhyay | G06F 8/61 |
| 11,593,094 | B2 * | 2/2023 | Amiga | G06F 8/65 |

(Continued)

FOREIGN PATENT DOCUMENTS

| CN | 105677356 A | * | 6/2016 | |
| CN | 112650526 A | * | 4/2021 | G06F 11/3684 |

(Continued)

OTHER PUBLICATIONS

Jett et al. "A Conceptual Model for Video Games and Interactive Media", 2016, JASIST (Year: 2016).*

(Continued)

*Primary Examiner* — Wei Y Zhen
*Assistant Examiner* — Junchun Wu
(74) *Attorney, Agent, or Firm* — Nicholson De Vos Webster & Elliott LLP

(57) ABSTRACT

This disclosure describes, in part, techniques for uploading network applications. For instance, system(s) may initially receive first data representing a first version of a network application and a first manifest that includes information describing the file contents of the first version. The system(s) may then store the first data and the first manifest within one or more databases. After the network application is updated to a second version, the system(s) may receive a second manifest that includes information describing the file contents of the second version of the network application. The system(s) may then use the first manifest and/or the second manifest to identify files that have been modified to create the second version of the network application. The system(s) may then receive second data representing the identified files and then reconstruct the second version of the network application using the first data and the second data.

20 Claims, 11 Drawing Sheets

(56) References Cited

U.S. PATENT DOCUMENTS

| | | | |
|---|---|---|---|
| 2012/0210312 A1* | 8/2012 | Ma | G06F 8/65 |
| | | | 717/170 |
| 2018/0204008 A1* | 7/2018 | Djabarov | H04L 67/34 |
| 2018/0285093 A1* | 10/2018 | Scheidel | G06F 9/45558 |
| 2019/0056929 A1* | 2/2019 | Lin | G06F 16/273 |
| 2019/0258530 A1* | 8/2019 | Moldvai | G06F 9/485 |
| 2019/0310837 A1* | 10/2019 | Zmijewski | G06F 16/986 |
| 2020/0310783 A1* | 10/2020 | Schmidt | A63F 13/352 |
| 2021/0329071 A1* | 10/2021 | Otten | H04L 67/34 |
| 2023/0409290 A1* | 12/2023 | Duggal | G06F 8/20 |

FOREIGN PATENT DOCUMENTS

| | | | | |
|---|---|---|---|---|
| CN | 112905230 A | * | 6/2021 | |
| CN | 113383533 A | * | 9/2021 | G06F 16/11 |
| CN | 113961221 A | * | 1/2022 | |
| CN | 114253572 A | * | 3/2022 | |
| WO | WO-2019032045 A1 | * | 2/2019 | G06F 15/00 |
| WO | WO-2020159651 A1 | * | 8/2020 | G06F 16/13 |

OTHER PUBLICATIONS

Xu et al., "Meditor: Inference and Application of API Migration Edits", 2019, IEEE (Year: 2019).*
Wang et al., "Peer-to-Peer File Sharing Game using Correlated Equilibrium", 2009, IEEE (Year: 2009).*
Gkantsidis et al., "Planet Scale Software Updates", Sep. 2006, ACM (Year: 2006).*

* cited by examiner

US 12,293,177 B1

TECHNIQUES FOR UPLOADING NETWORK APPLICATIONS

BACKGROUND

As gaming has become popular, companies have created new techniques, such as network accessible systems, that allow users to play various types of games. For example, a system, which may be wirelessly connected to a television via network(s), may cause the television to display content related to a state of a game. While the television is displaying the content, the system may receive, via the network(s), inputs from a video game controller and update, using the inputs, the state of the game being displayed by the television. In some circumstances, the systems allow developers to upload these games that are available to the users. However, based on the sizes of these games, the systems may require a great amount of computing resources each time new versions of these games are uploaded.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
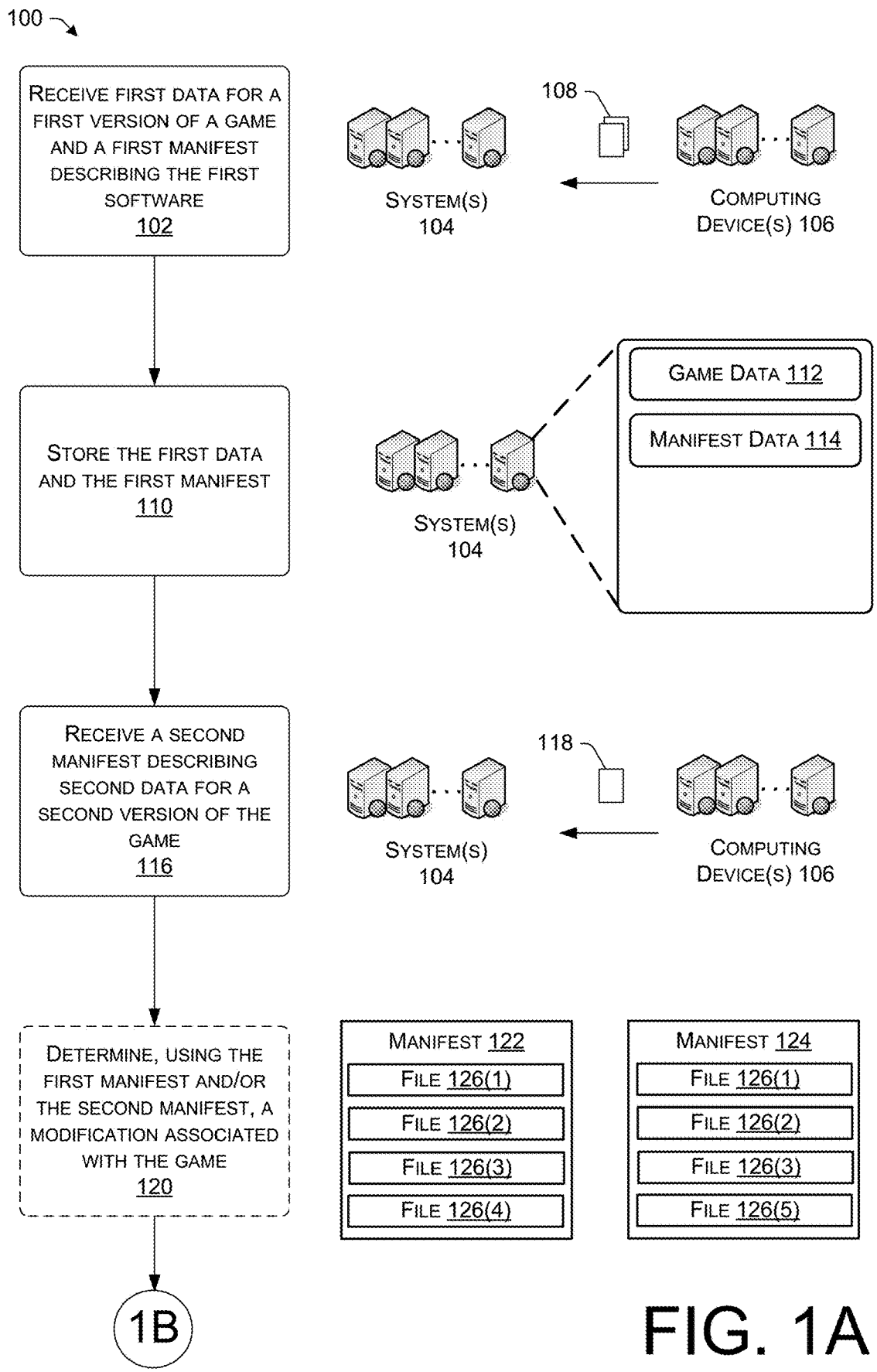
FIGS. 1A-1B illustrate an example process for uploading a network application, in accordance with examples of the present disclosure.

This disclosure describes, in part, techniques for uploading network applications onto system(s). For instance, the system(s) may allow a developer to upload a network application (e.g., software representing the network application), such as a network game, using computing device(s). Additionally, the system(s) may receive and/or generate a manifest describing the file contents of the network application. The system(s) may then store the network application and the manifest, such as in one or more databases. Next, when the developer updates the network application, such as by creating a new version of the network application, the system(s) may receive a new manifest describing the file contents of the new version of the network application. The system(s) may then use the original manifest and/or the new manifest to identify modification(s) that occurred with file(s) when creating the new version of the network application. Based on identifying the modification(s), the system(s) may receive the modified file(s) of the network application from the computing device(s) without receiving file(s) that were not modified. The system(s) may then reconstruct the new version of the network application using the original files along with the modified file(s). This way, the system(s) do not require the developer to upload the entire new version of the network application, which saves computing resources.

For more detail, the system(s) may provide resources that allow developers to upload network applications, such as games, that are accessible via network(s). For example, a developer may use computing device(s) to establish a network connection with the system(s). Once connected, the system(s) may provide a resource, such as a command-line interface (CLI), that the developer may use to upload a network application. The developer may then use the computing device(s) to send the network application to the system(s). If this is the first time that the developer has sent the network application to the system(s), the network application may include a "first version" of the network application. In some examples, the system(s) may specify a package type for uploading the network application to the system(s). The package type may be associated with collecting files of the network application into one archive file for uploading to the system(s). For instance, the package type may include "tar" where the archive file is referred to as a "tarball."

In some examples, the developer may also use the computing device(s) to send a manifest (referred to, in some examples, as a "first manifest") associated with the first version of the network application. The first manifest may include a human and/or system readable document that summarizes the file contents and/or other type of data of the first version of the network application. For example, the first manifest may include information describing at least the files, the paths to the files, the sizes of the files, hash details for the files, any updates to the files, and/or any other information associated with the first version of the network application. In some examples, the first manifest includes a specific file format, such as JavaScript Object Notation format, although this is only one example file format for the first manifest. In other examples, the system(s) may generate the first manifest using the first version of the network application rather than receiving the first manifest from the computing device(s).

The system(s) may then store the first version of the network application along with the first manifest. In some examples, the system(s) associate the first manifest with the first version of the network application. For example, the system(s) may store data to identifies the first manifest, identifies the first version of the network application, and identifies that the first manifest describes the contents of the first version of the network application. In some examples, the system(s) store the first version of the network application using a technique that allows for the system(s) to more quickly update the network application. For example, the system(s) may store the first version of the network application using chunks, where each chunk includes a portion of the network application. Techniques for storing the network application are described in more detail below.

In some examples, the system(s) originally store the first version of the network application and/or the first manifest in one or more memories. In order to provide the network application to users, the system(s) may then retrieve the first version of the network application and/or the network application from the one or more memories and store the store the first version of the network application and/or the first manifest using a virtual storage device. As described herein, the virtual storage device may include a storage volume, such as an Elastic Block Store (EBS), that is stored remotely (e.g., a cloud-based storage) from the computing device(s) and/or user devices. In some examples, the system(s) may generate different types of virtual storage devices. For example, the system(s) may generate solid-state drives, hard disk drive, and/or any other type of remote storage drives. After the system(s) generate the virtual storage device, the system(s) may create a file system on the virtual storage device, run a database on the virtual storage device, store a network application on the virtual storage device, and/or perform one or more additional and/or alternative processes with the virtual storage device.

Next, after uploading the first version of the network application, the developer may modify the network application in order to create a second version of the network application. Modifying the network application may include, but is not limited to, updating file(s) of the network application, updating program(s) of the network application, creating new file(s) for the network application, creating new programs for the network application, and/or any other type of modification that a developer may make to the network application. In some examples, the developer may only modify a small portion of the network application. For example, the developer may only modify a small number of the files, such as one file, two files, three files, and/or the like. In some examples, the developer may modify a larger portion of the network application. For example, the developer may modify a large number of the files, such as one thousand files, five thousand files, ten thousand files, and/or the like.

The developer may then want to upload the second version of the network application to the system(s). In some examples, to upload the second version of the network application, the system(s) may receive, from the computing device(s), a manifest (referred to, in some examples, as a "second manifest") associated with the second version of the network application. As described herein, the second manifest may include a human and/or system readable document that summarizes the file contents and/or other type of data of the second version of the network application. For example, the second manifest may include information describing at least the files, the paths to the files, the sizes of the files, hash details for the files, any updates to the files, and/or any other information associated with the second version of the network application. In some examples, the second manifest may include information associated with an entirety of the contents of the second version of the network application. For example, the second manifest may include information for all of the files of the second version of the network application. In some examples, the second manifest may only include information associated with the portion(s) of the first version of the network application that were modified in order to generate the second version of the network application. For example, the second manifest may include information for only the files that were modified in order to generate the second version of the network application.

The system(s) may then use the first manifest and/or the second manifest to identify portions of the second version of the network application to receive in order to update the first version of the network application. For instance, and in examples where the second manifest includes information associated with an entirety of the contents of the second version of the network application, the system(s) may compare the first manifest to the second manifest in order to identify the modification(s) that occurred in order to create the second version of the network application. For example, if a file was modified to create the second version of the network application, the system(s) may compare the first manifest to the second manifest and, based on the comparison, determine that a hash associated with the file as represented by the first manifest does not match a hash associated with the file as represented by the second manifest. As such, the system(s) may determine that the file has been modified (e.g., updated).

Alternatively, and in examples where the second manifest only includes the information associated with the portion(s) of the first version of the network application that were modified in order to generate the second version of the network application, the system(s) may analyze the second manifest in order to identify the portion(s) of the network application. For example, and using the example above, the system(s) may analyze the second manifest in order to identify the file that was modified in order to generate the second version of the network application. The system(s) are able to identify the file based on the information associated with the file being included in the second manifest.

Additionally, or alternatively, from the system(s) identifying the modifications that occurred to generate the second version of the network application, in some examples, the computing device(s) associated with the developer may perform similar processes as the system(s) to identify the modification(s). For example, the computing device(s) may receive the first manifest from the system(s). The computing device(s) may then compare the first manifest to the second manifest, which was generated by the computing device(s), in order to identify the modification(s) that occurred in order to create the second version of the network application. For example, if a file was modified to create the second version of the network application, the computing device(s) may compare the first manifest to the second manifest and, based on the comparison, determine that a hash associated with the file as represented by the first manifest does not match a hash associated with the file as represented by the second manifest. As such, the computing device(s) may determine that the file has been modified (e.g., updated).

In either of these examples, the system(s) may then receive only the modified portion(s) of the network application from the computing device(s). In some examples, such as when the system(s) identify the modification(s), to receive the modified portion(s), the system(s) may send, to the computing device(s), a request that identifies the modified portion(s). For example, if the modified portion(s) include file(s) of the network application, then the request may indicate each of the file(s). The system(s) may then receive the modified portion(s) of the network application from the computing device(s). For example, and again when the modified portion(s) include the file(s), the system(s) may receive those file(s) from the computing device(s), but without receiving other files that were not modified in order to generate the second version of the network application. In some examples, the system(s) receive the modified portion(s) using a similar technique that the system(s) used to receive the first version of the network application. For example, the system(s) may receive the modified portion(s) of the network application in a single file package. Additionally, in some examples, such as when the computing device(s) identified the modification(s), the system(s) may receive a manifest that indicates the modification(s) that occurred.

The system(s) may then use the portion(s) of the network application and a manifest (referred to, in some examples, as a "third manifest") in order to reconstruct the full update of the network application. In some examples, such as when the second manifest only includes the information associated with the portion(s) of the first version of the network application that were modified in order to generate the second version of the network application, the third manifest may include the second manifest. In other examples, such as when the second manifest includes information associated with an entirety of the contents of the second version of the network application, the system(s) and/or the computing device(s) may generate the third manifest using the first manifest and the second manifest. For example, the third manifest may include the differences between the first manifest and the second manifest.

As described herein, the third manifest may include the information describing the portion(s) of the first version of the network application that were modified in order to generate the second version of the network application. As such, the system(s) may use the third manifest in order to determine how to update the first version of the network application using the modified portion(s). For example, and if a modified portion includes a modified file, then the system(s) may use the third manifest in order to determine which file of the first version of the network application to replace with the modified file. After reconstructing the full update of the network application, the system(s) may then store the third manifest in association with the reconstructed network application (e.g., the second version of the network application) and/or the first manifest. This way, the system(s) maintain a full manifest (e.g., the first manifest combined with the third manifest) of the second version of the network application.

It should be noted that, while the examples above describe the portion(s) of the network application as including file(s), in other example, the portion(s) may include only part of a file, such as a chunk of a file. In such examples, the system(s) are still able to update only part of a file based on how the system(s) store the network application in the one or more databases. For example, and as described above, the system(s) may store the network application in chunks, where each chunk includes a specific size. As such, the system(s) are able to use the chunks in order to update only part of a file.

Additionally, it should be noted that, while the examples above describing modifying or adding file(s) to reconstruct the second version of the network application, in other examples, the system(s) may remove file(s), move file(s), and/or rename file(s) from the first version of the network application in order to reconstruct the second version of the network application. In such examples, the system(s) may not receive any additional data from the computing device(s) except for the third manifest. The system(s) may then just use the third manifest to remove the file(s), move the file(s) (e.g., change the path(s) for the file(s)), and/or rename the file(s).

Furthermore, it should be noted that, while the examples above describe performing these processes when a network application is updated to a new version, in other examples, similar processes may be used in order to create a new network application. For example, the developer may create a new network application that uses at least some of the resources (e.g., files) from the other network application that is already stored by the system(s). As such, to upload the new network application, the computing device(s) may again send a manifest associated with the new network application. For instance, the manifest may include information describing at least the files, the paths to the files, the sizes of the files, hash details for the files, any updates to files, and/or any other information associated with the new network application. The system(s) may then perform the processes described herein in order to identify differences between the original network application and the new network application.

The system(s) may then only receive the data representing the differences between the network applications. Additionally, for portions of the original network application that are used by the new network application, the system(s) may retrieve those portions from the one or more databases and use those portions, along with the received data, in order to reconstruct the new application. Similar to the processes above, the system(s) may generate a new manifest that includes information for reconstructing the new network application.

As described above, the system(s) may provide the network application to users via networks. For example, the system(s) may create a virtual server that the system(s) use to install the network application. As described herein, a virtual server may include a server (e.g., computer and server programs) that executes at a remote location and is used to run applications. For example, the virtual server may include one or more dedicated computing resources, such as central processing units (CPUs), memory, storage, network capacity, and/or the like, for running and providing the application. The system(s) may then install the network application onto the virtual server. In some examples, the system(s) install the network application onto the virtual server using the virtual storage device. Once the network application is installed on the virtual server, a user is then able to access the network application using the virtual server.

For example, the system(s) may receive, from a user device, a request to access the network application. Based on the request, the system(s) may assign the user device to the virtual server that is associated with the network application. The system(s) may then cause a launching of the network application on the virtual server. For example, the system(s) may cause a launch file associated with the network application to execute on the virtual server. Once the network application is launched, the system(s) may then send data (e.g., video data, audio data, etc.) to and/or receive data (e.g., input data) from the user device while the user is accessing the network application.

For instance, the system(s) may send, to the user device, data (e.g., video data, audio data, etc.) representing a first state of the network application. For example, if the network application includes a game, the first state of the network application may include an object (e.g., a character) located at a first position within a gaming environment (e.g., a forest). The user device may receive the data from the system(s) and, using the data, the user device may display image(s) representing the first state of the network application. For example, and again if the network application includes the network game, the user device may display content representing the object located at the first position within the gaming environment. In some instances, the user device may further output sound represented by the audio data. The user may then use the user device and/or a separate control device to provide inputs to the network application via the system(s).

For instance, the control device may receive an input, such as a selection of a button, joystick, key, touch-sensitive pad, sensor, and/or the like associated with the control device. The control device may then send, to the system(s), data representing the input. Using the data, the system(s) may update the first state of the network application to a second state of the network application using the virtual server. For example, and again if the network application includes the network game, the input may be associated with moving the object forward by a given amount within the gaming environment. As such, the system(s) may update the first state of the of the network application to the second state of the network application by moving the object forward in the environment by the given amount.

The system(s) may then send, to the user device, data (e.g., video data, audio data, etc.) representing the second state of the application. Using the data, the user device may display image(s) representing the second state of the game. For example, the user device may display content representing the object located at the second position within the gaming environment. Additionally, in some instances, the user device may output sound represented by the audio data. The system(s) may then continue to perform similar processes to update the state of the network application on the user device as the system(s) continues to receive data from the control device. This way, the system(s) are able to provide the user with the network application without sending the actual data representing the second version of the network application to the user device for installation on the user device.

By performing the processes described herein, the system(s) may only be required to receive a portion of the network application when the network application is updated from a previous version to a new version. This may save computing resources, such as network resources, since less data is communicated between the system(s) and the computing device(s). For example, a network application may include a large amount of data, such as 250 gigabytes. As such, if the developer has to upload an entirety of the data each time the developer creates a new version of the network application, each upload will require a large amount of computing resources. However, by performing the processes described herein, the developer may only have to upload a portion of the network application, such as a few megabytes of the network application, each time the developer creates a new version. The system(s) are then able to use the previous version of the network application, the received portion, and a manifest to reconstruct the new version of the network application for the developer.

As described herein, a file may include, but is not limited to, a JavaScript Object Notation (JSON) file, a Batch file, a Hypertext Markup Language (HTML) file, an Extensible Markup Language (XML) file, an executable (EXE) file, a log file, a zip file, and/or any other file format type. Additionally, as described herein, an identifier may include, but is not limited to, a numerical identifier, an alphabetic identifier, an alphanumerical identifier, and/or any other type of identifier.

Figure 1B:
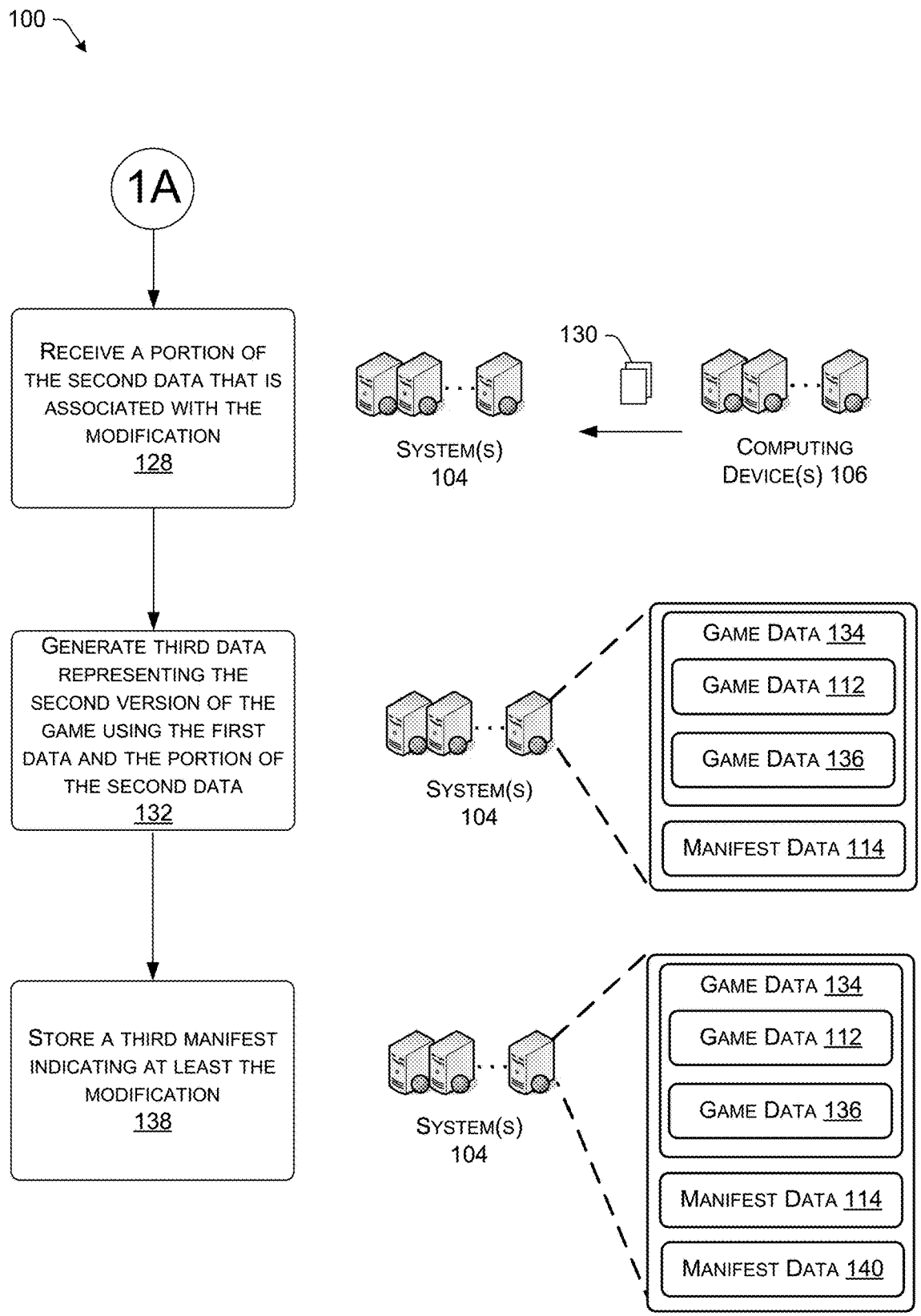

FIGS. 1A-1B illustrate an example process 100 for uploading a game, in accordance with examples of the present disclosure. At 102, the process 100 may include receiving first data for a first version of a game and a first manifest describing the first software. For instance, system(s) 104 may receive the first data and the first manifest from computing device(s) 106 associated with a developer of the game, which is represented by 108. As described herein, the first data may include at least the files and/or other type of content for launching, executing, and/or terminating the game. Additionally, the first manifest may include a human and/or system readable document that summarizes the file contents and/or other type of data of the first version of the game. For example, the first manifest may include information describing at least the files, the paths to the files, the sizes of the files, hash details for the files, any updates to files, and/or any other information associated with the first version of the game.

At 110, the process 100 may include storing the first data and the first manifest. For instance, the system(s) 104 may store first game data 112 and first manifest data 114 representing the first manifest. In some examples, the system(s) 104 store the first manifest data 114 in association with the first game data 112. For a first example, the system(s) 104 may store additional data that links the first manifest data 114 to the first game data. For a second example, the system(s) 104 may store the first game data 112 and the first manifest data 14 on a similar storage device. In some examples, the system(s) 104 initially store the first game data 112 and the first manifest data 144 in one or more memories. The system(s) 104 (and/or one or more additional system(s)) may then retrieve the first game data 112 and/or the first manifest data 114 from the one or more memories and store the first game data 112 and/or the first manifest data 114 on a virtual storage device. As described herein, the system(s) 104 (and/or the additional system(s)) may use the virtual storage device to install the first game data 112 on a virtual server that the system(s) 104 (and/or the additional system(s)) use to provide the game to a user.

At 116, the process 100 may include receiving a second manifest describing second data for a second version of the game. For instance, the developer may have modified the first data in order to generate the second data associated with the second version of the game. Based on the modification, the developer may want to upload the second version of the game to the system(s) 104. As such, the system(s) 104 may receive the second manifest from the computing device(s) 106, which is represented by 118. As described herein, in some examples, the second manifest may include information associated with an entirety of the contents of the second version of the game. In other examples, the second manifest may only include information associated with the portion(s) (e.g., file(s)) of the first version of the game that were modified in order to generate the second version of the game.

In some examples, the system(s) 104 initially receive, from the computing device(s) 106, an indication that the first version of the game has been updated to the second version of the game. For instance, the indication may include a request to update the game using the second version of the game, where the request includes at least an identifier associated with the game. The system(s) 104 may then retrieve the first manifest for the first version of the game. For example, the system(s) 106 may use the identifier of the game to identify the first manifest (e.g., match the identifier to an identifier associated with the first manifest). The system(s) 104 may then send the first manifest to the computing device(s) 106. The computing device(s) 106 may then perform the processes below, with respect to the system(s) 104, in order to identify the modification.

While the example of FIGS. 1A-1B illustrate the computing device(s) 106 as identifying the modification(s) and sending the manifest 118 representing the modification(s), in other examples, the system(s) 106 may identify the modification(s). For instance, at 120, process 100 optionally may include determining, using the first manifest and/or the second manifest, a modification associated with the game. For example, the second manifest 122 may include information associated with an entirety of the contents of the second version of the game. As such, the system(s) 104 may analyze the first manifest 122 with respect to the second manifest 124 in order to determine the modification(s) that occurred in order to generate the second version of the game. As shown by the example of FIGS. 1A-1B, the first manifest 122 includes the information associated with first files 126(1)-(4) represented by the first data and the second manifest 124 includes information associated with second files 126(1)-(3), 126(5) represented by the second data. As such, based on the analysis, the system(s) 104 may determine that the file 126(4) from the first data was modified in order to generate the file 126(5) from the second data. For example, at least a portion of the data included in the file 126(4) may have been updated by the developer in order to create the second version of the game. As such, the system(s) 104 may determine that the modification includes the file 126(4) being modified in order to generate the file 126(5).

In some examples, to identify the modification, the system(s) 104 may determine that a hash associated with the file 126(4) described by the first manifest 122 does not match a hash associated with the file 126(5) described by the second manifest 124. The system(s) may then use similar processes to determine that the files 126(1)-(3) represented by the first data are similar to the files 126(1)-(3) represented by the second data. For instance, the system(s) 104 may determine that a hash associated with the file 126(1) described by the first manifest 122 matches a hash associated with the file 126(1) described by the second manifest 124, a hash associated with the file 126(2) described by the first manifest 122 matches a hash associated with the file 126(2) described by the second manifest 124, and a hash associated with the file 126(3) described by the first manifest 122 matches a hash associated with the file 126(3) described by the second manifest 124.

At 128, the process 100 may include receiving a portion of the second data that is associated with the modification. For instance, the system(s) 104 may receive, from the computing device(s) 106, the portion of the second data that is associated the modification, which is represented by 130. In some examples, such as when the system(s) 104 identify the modification, the system(s) 104 receive the portion of the second data based on sending, to the computing device(s) 106, a request that indicates the portion of the second data. In some examples, such as when the computing device(s) 106 identify the modification, the computing device(s) 106 automatically send the portion of the second data to the system(s) 104, such as when the computing device(s) 106 send the second manifest 124. For example, the computing device(s) 106 may send the portion of the second data along with the second manifest 124 since the portion of the second data is associated with the modification made to the game.

At 132, the process 100 may include generating third data representing the second version of the game using the first data and the portion of the second data. For instance, the system(s) 104 may generate third game data 134 by reconstructing the second version of the game using the first game data 112 (e.g., stored in the one or more memories) and the portion of the second game data 136 received from the computing device(s) 106. In some examples, reconstructing the second version of the game may include replacing a file represented by the first game data 112 with a file represented by the second portion of the second game data 136. In some examples, reconstructing the second version of the game may include replacing a portion of file represented by the first game data 112 with a portion of a file represented by the portion of the second game data 136. Still, in some examples, reconstructing the second version of the game may include adding a file represented by the portion of the second game data 136 to the files represented by the first game data 112. While these are just a couple examples of reconstructing the second version of the game, in other examples, the system(s) 104 may perform any other techniques to reconstruct the second version of the game.

The system(s) 104 may use a third manifest when reconstructing the second version of the game. In some examples, such as when the second manifest 124 only includes the information associated with the portion(s) of the first version of the game that were modified in order to generate the second version of the game, the third manifest may include the second manifest 124. In other examples, and in the example of FIGS. 1A-1B, such as when the second manifest 124 includes information associated with an entirety of the contents of the second version of the game, the system(s) 104 may generate the third manifest using the first manifest 122 and the second manifest 124. For example, the third manifest may include the differences between the first manifest 122 and the second manifest 124. In the example of FIGS. 1A-1B, this means that the system(s) 104 may generate the third manifest to include the information associated with the file 126(5).

To reconstruct the second version of the game using the third manifest, the system(s) 104 may analyze the information included in the third manifest in order to determine how to modify the first game data 112. For example, the information may indicate that the file 126(5) includes an updated version of the file 126(4). As such, the system(s) 104 may use that information to replace the file 126(4) with the file 126(5).

At 138, the process 100 may include storing a third manifest indicating at least the modification. For instance, the system(s) 104 may store the third manifest, which is represented by manifest data 140. In some examples, the system(s) 104 store the third manifest in association with the third game data 134 and/or the first manifest. This way, the system(s) 104 store both the first manifest describing the first version of the game and the third manifest describing the modifications for creating the second version of the game. In some examples, the system(s) 104 initially store the third manifest and/or the third game data 134 in the one or more memories. The system(s) 104 (and/or one or more additional system(s)) may then retrieve the third manifest data 140 and/or the third game data 134 from the one or more memories and store the third manifest data 140 and/or the third game data 134 on a virtual storage device. As described herein, the system(s) 104 (and/or the additional system(s)) may use the virtual storage device to install the third game data 134 on a virtual server that the system(s) 104 (and/or the additional system(s)) use to provide the game to a user.

Figure 2:
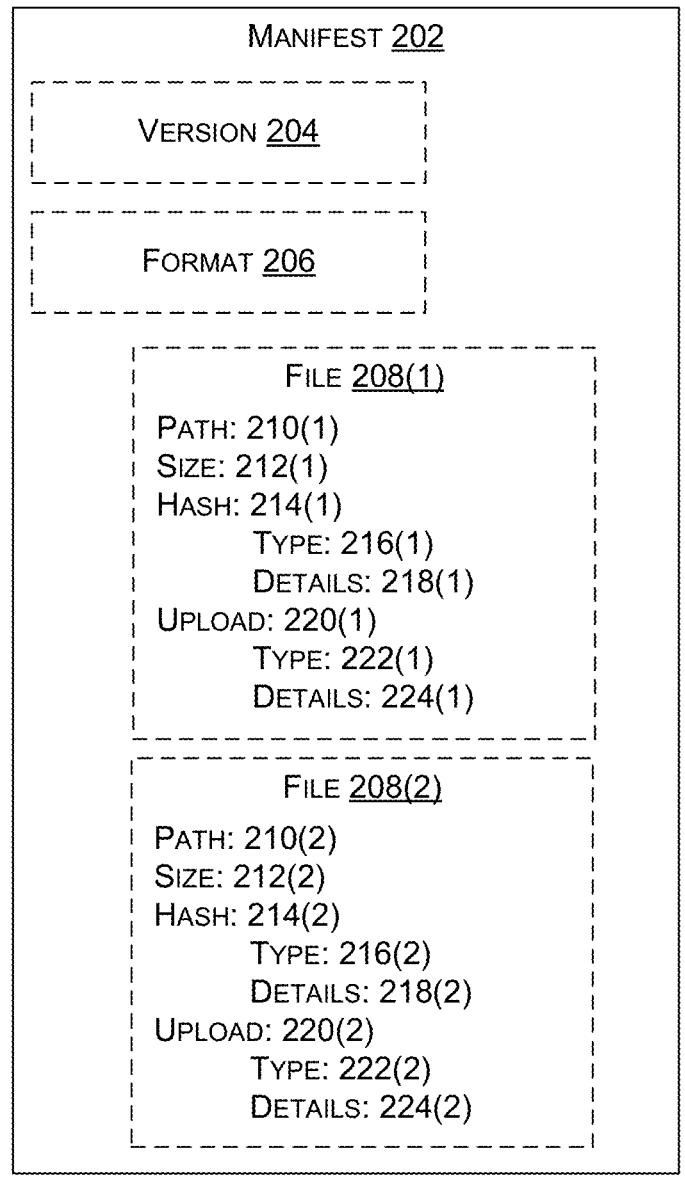
FIG. 2 illustrates an example of a manifest that includes information describing a version of a network application, in accordance with examples of the present disclosure.

As described above, the system(s) 104 may receive manifests that include information describing the versions of a network application. As such, FIG. 2 illustrates an example of a manifest 202 that includes information describing a version of a network application, in accordance with examples of the present disclosure. As shown, the manifest 202 includes information describing a version 204 associated with the manifest 202. In some examples, the version 204 may include a simple version number that describes the schema of the manifest 202. However, in other examples, the version 204 may include any other type of content that indicates the version 204 of the manifest 202 and/or the version 204 of the network application. The manifest 202 also includes information describing a format 206 for uploaded data for the network application. In some examples, the format 206 includes a string that describes the packaging format. For example, if the format includes TAR, then the format 206 would indicate the packaging format of "TAR". However, in other examples, the packaging format 206 may include any other type of packaging format for data.

The manifest 202 also includes information describing files 208(1)-(2) associated with the version of the network application. While the example of FIG. 2 only illustrates the manifest 202 as including information for two files 208(1)-(2), in other examples, the manifest 202 may include information for any number of files. For example, the manifest 202 may include information for one file, five files, one hundred files, one thousand files, one million files, and/or the like. As shown in the example of FIG. 2, the manifest 202 includes information for each of the files 208(1)-(2).

For example, and for the file 208(1), the manifest 202 includes information describing a path 210(1) to the file 208(1). In some examples, the path 210(1) includes a string that represents the path to the file 208(1). However, in other examples, the path 210(1) may include another type of information that indicates the path to the file 208(1). The manifest 202 also includes information describing a size 212(1) of the file 208(1). In some examples, the size 212(1) may include a number representing the size, such as in bytes. For example, the size 212(1) may indicate that the file 208(1) is one megabyte, ten megabytes, one hundred megabytes, and/or the like. In some examples, if the file 208(1) is a folder, then the size 212(1) may indicate that the folder is zero bytes.

The manifest 202 also includes information describing a hash 214(1). In some examples, the hash 214(1) may include information that is used by the system(s) 104 and/or the computing device(s) 106 to determine whether the content of the file 208(1) has been modified, which is described in more detail below. As shown, the manifest 202 may further includes a type 216(1) associated with the hash 214(1) and details 218(1) about the hash 214(1). The type 216(1) includes information describing the type of hash 214(1), where the type may vary based on the file 208(1). For example, if the file 208(1) is small, then the file 208(1) may include a single hash 214(1) (e.g., a single MD5 hash). Additionally, if the file 208(1) is large, then the file 208(1) may include one or more hashes 214(1) with one or more values (e.g., one or more MD5 hashes with one or more xxHash values). The details 218(1) may include information describing parameters that are based on the type 216(1).

The manifest 202 also includes information describing an upload 220(1) of the data. In some examples, the upload 220(1) is optional and may be used when the file 208(1) has been modified such that the computing device(s) 106 are updating the file 208(1). As such, and in some examples, if the upload 220(1) is omitted, then the system(s) 104 will not apply any update to the file 208(1). As shown, the manifest 202 includes a type 222(1) associated with the upload 220(1) and details 224(1) describing the upload 220(1). The type 222(1) may include a string that represents the type of upload. For example, the string may indicate whether the upload includes only a part of the file 208(1) (e.g., type: DIFF) or all of the file 208(1) (e.g., type: FULL). The details 224(1) may then include information representing the parameters for reconstructing the file 208(1). In some examples, the details 224(1) are included when the type 222(1) indicates that only part of the file 208(1) is being uploaded.

As shown by the example of FIG. 2, the manifest 202 includes similar information describing a path 210(2), a size 212(2), a hash 214(2), a type 216(2) of the hash 214(2), details 218(2) for the hash 214(2), an upload 220(2), a type 222(2) of the upload 220(2), and details 224(2) for the upload 220(2) for the file 208(2). In some examples, the manifest 202 may not include at least some of the information for the files 208(1)-(2). In some examples, the manifest 202 may include additional information for the files 208(1)-(2).

Figure 3:
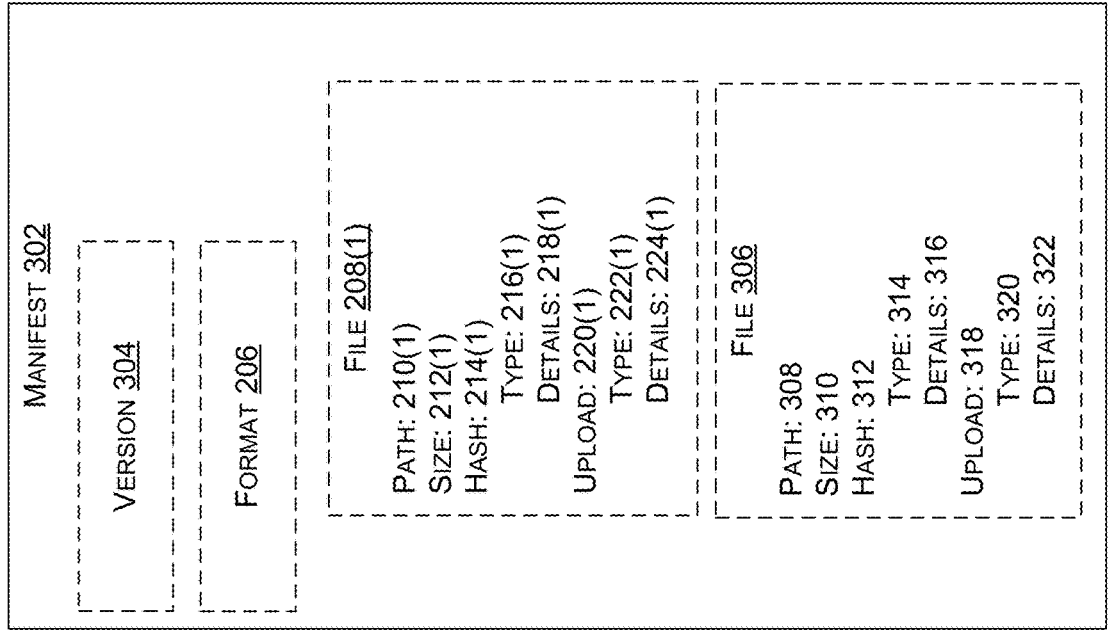
FIG. 3 illustrates an example of using manifests in order to identify a modification with a new version of a network application, in accordance with examples of the present disclosure.
Figure 3:
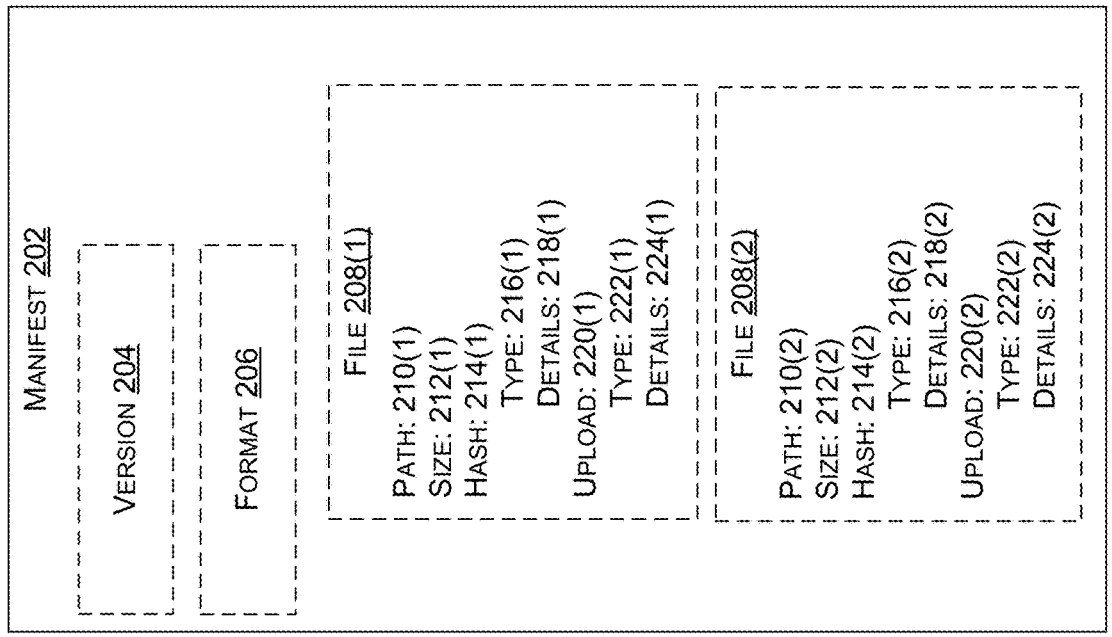

As also described above, the system(s) 104 may use the manifests in order to identify modification(s) with a new version of a network application. As such. FIG. 3 illustrates an example of using the manifest 202 and another manifest 302 in order to identify a modification with a new version of the network application, in accordance with examples of the present disclosure. In the example of FIG. 3, the manifest 202 may be associated with the version 204 of the network application while the manifest 302 is associated with a new version 304 of the network application. As shown, the manifest 302 includes an updated file 306, which includes an updated path 308, hash 312, type 314 of the hash 312, details 316 for the hash 312, upload 318 indicator, type 320 of the upload 318, and details 322 for the upload 318.

In order to identify the modification with the network application, the system(s) 104 may analyze the manifest 202 with respect to the manifest 302 in order to identify whether there has been a modification with at least one of the files 208(1)-(2) of the network application. For example, the system(s) 104 may compare the hash 214(1)-(2) values of the files 208(1)-(2) from the manifest 202 with respect to the hash 214(1), 312 values of the files 208(1), 306 from the manifest 302 in order to determine that at least a portion of the file 208(2) has been updated. As such, the system(s) 104 may determine that the modification for the network application includes an update to the file 208(2). Because of this, the system(s) 104 may only request the file 306 from the computing device(s) 106. After receiving the file 306, the system(s) 104 may then use the file 306 and the data for the previous version of the network application to reconstruct the new version of the network application.

The system(s) 104 may also determine that the file 208(1) has not been modified using the manifest 202 and the manifest 302. For example, and as described above, the system(s) 104 may compare the hash 214(1) value for the file 208(1) from the manifest 202 to the hash 214(1) value for the file 208(1) from the manifest 302. Based on the comparison, the system(s) 104 may determine that the hash 214(1) value is the same in both the manifest 202 and the manifest 302. As such, the system(s) 104 may determine that the file 208(1) has not been modified in order to create the new version of the network application. Because of this, the system(s) 104 may not again receive the file 208(1) from the computing device(s) 104 when reconstructing the new version of the network application.

It should be noted that, in some examples, since the file 208(1) has not been modified when creating the new version of the network application, the manifest 302 may not include the information for the upload 220(1), the type 222(1), and/or the details 224(1). Additionally, in some examples, since the file 208(1) has not been modified when creating the new version of the network application, the manifest 302 may not include any of the information for the file 208(1).

Figure 4:
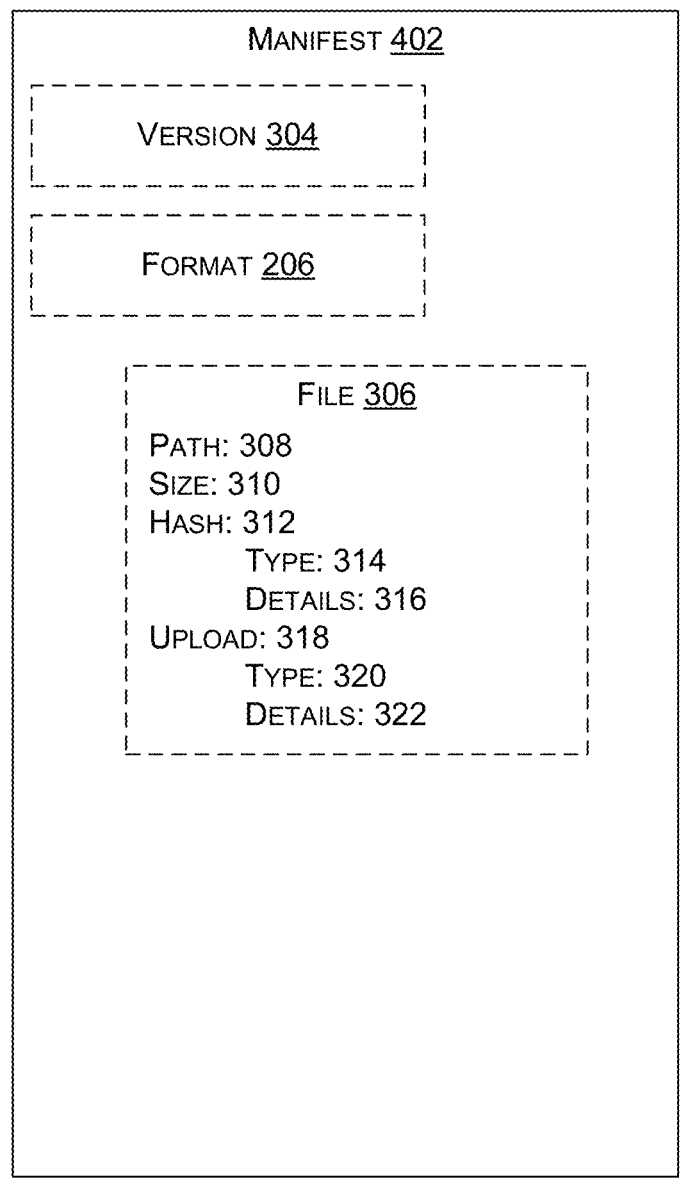
FIG. 4 illustrates an example of a manifest that includes information describing the modification(s) that occurred with creating a new version of a network application, in accordance with examples of the present disclosure.

As also described above, the system(s) 104 may use a manifest that includes information about the modification(s) that occurred when creating a new version of a network application to reconstruct the new version of the network application. As such, FIG. 4 illustrates an example of a manifest 402 that includes information about the modification(s) that occurred with creating the new version of a network application, in accordance with examples of the present disclosure. In some examples, the system(s) 104 may receive the manifest 402 from the computing device(s) 106. For example, the system(s) 104 may receive the manifest 402 in addition to, or alternatively from, receiving the manifest 302 from the computing device(s) 106. In some examples, the system(s) 104 may generate the manifest 402. For example, the system(s) 104 may generate the manifest 402 using the manifest 202 and the manifest 302, where the manifest 402 includes the differences between the manifest 202 and the manifest 302.

As shown, the manifest 402 only includes the information for the file 306 that was modified in order to create the new version of the network application. For instance, the manifest 306 includes the information that the system(s) 104 need to reconstruct the new version of the network application using the file 306. As such, the system(s) 104 may use the manifest 402, the file 306, and the previous version of the network application in order to reconstruct the new version of the network application.

As described above, the system(s) 104 may use the files received from the computing device(s) 106 in order to reconstruct a new version of a network application. As such, FIG. 5 illustrates an example of reconstructing a new version of a network application 502 using chunks 504(1)-(2) received from the computing device(s) 106, in accordance with examples of the present disclosure.

As shown, the system(s) 104 may initially store a first version of a network application 506. In some examples, the system(s) 104 store the first version of the network application 502 using chunks 508(1)-(N). The chunks 508(1)-(N) may include parts of files, files, programs, folders, and/or any other portion of the network application. The system(s) 104 may then receive a data package 510 that includes the chunks 504(1)-(2) that have been modified in order to create the second version of the network application 502. Additionally, the system(s) 104 may use the first version of the network application 506 and the data package 510 to reconstruct the second version of the network application 502.

For example, the system(s) 104 may use manifest(s) to determine that the chunk 508(3) has been updated. As such, the system(s) 104 may initially reconstruct the second version of the network application 502 by replacing the chunk 508(3) with the chunk 504(1). The system(s) 104 may also use the manifest(s) to determine that the chunk 508(8) has been updated. As such, the system(s) 104 may also reconstruct the second version of the network application 502 by replacing the chunk 508(8) with the chunk 504(2). By performing these processes, the system(s) 104 may only have to receive the data package 510 from the computing device(s) 106, rather than the entire second version of the network application 502, which saves computing resources when updating the network application.

Figure 5:
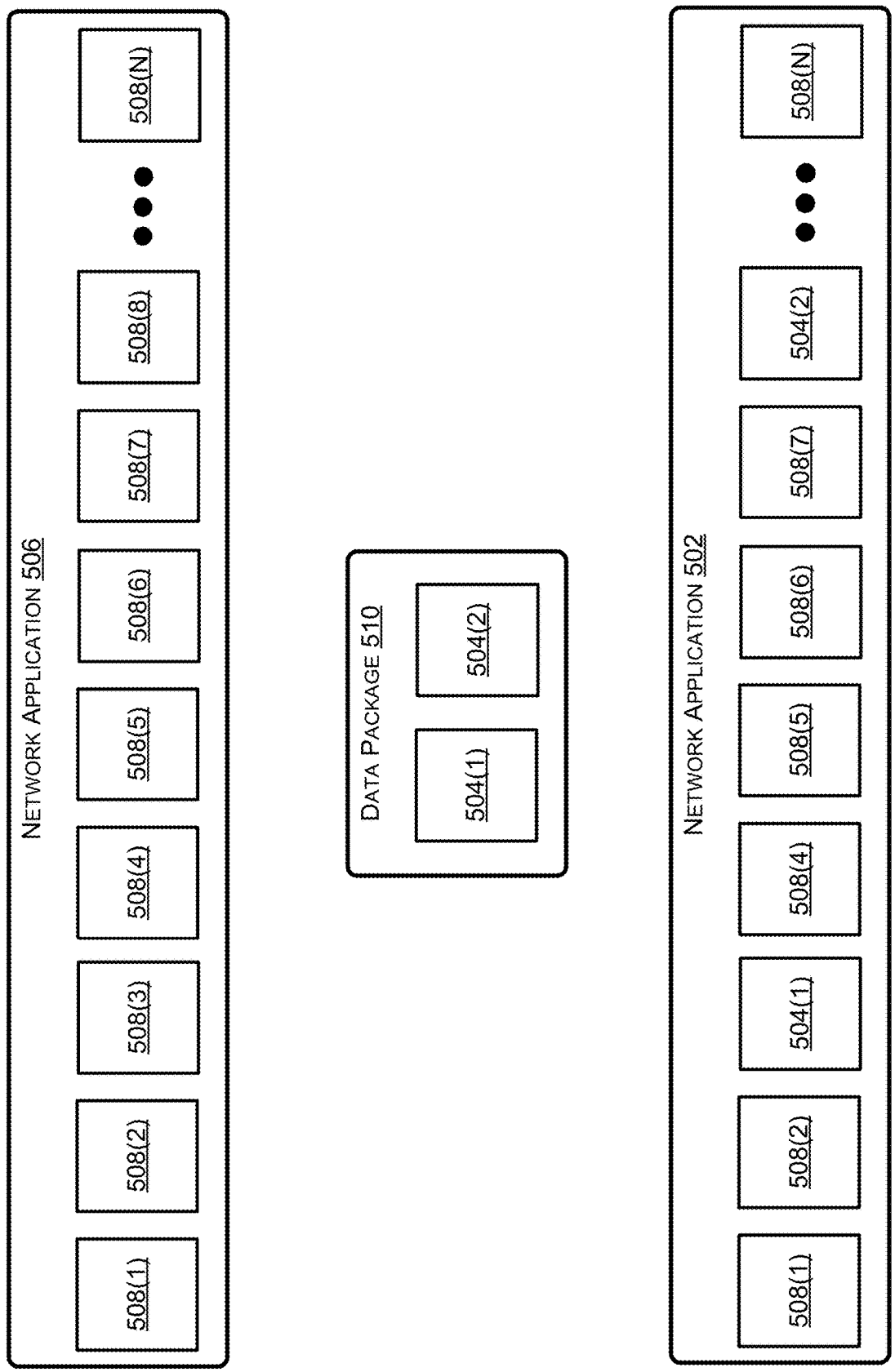
FIG. 5 illustrates an example of reconstructing a new version of a network application using files received from computing device(s), in accordance with examples of the present disclosure.

While the example of FIG. 5 illustrates reconstructing the second version of the network application 502 by updating chunks, in other examples, the system(s) 104 may reconstruct the second version of the network application 502 using additional and/or alternative techniques. For a first example, the system(s) 104 may reconstruct the second version of the network application by 502 by removing one or more of the chunks 508 (e.g., the manifest(s) may indicate that the chunk(s) 508 have been removed). For a second example, the system(s) 104 may reconstruct the second version of the network application 502 by renaming and/or moving one or more of the chunks 508 (e.g., the manifest(s) may indicate new path(s) for the chunk(s) 508). In other words, the system(s) 104 may reconstruct the second version of the network application 502 without actually receiving new data from the computing device(s) 106.

Figure 6:
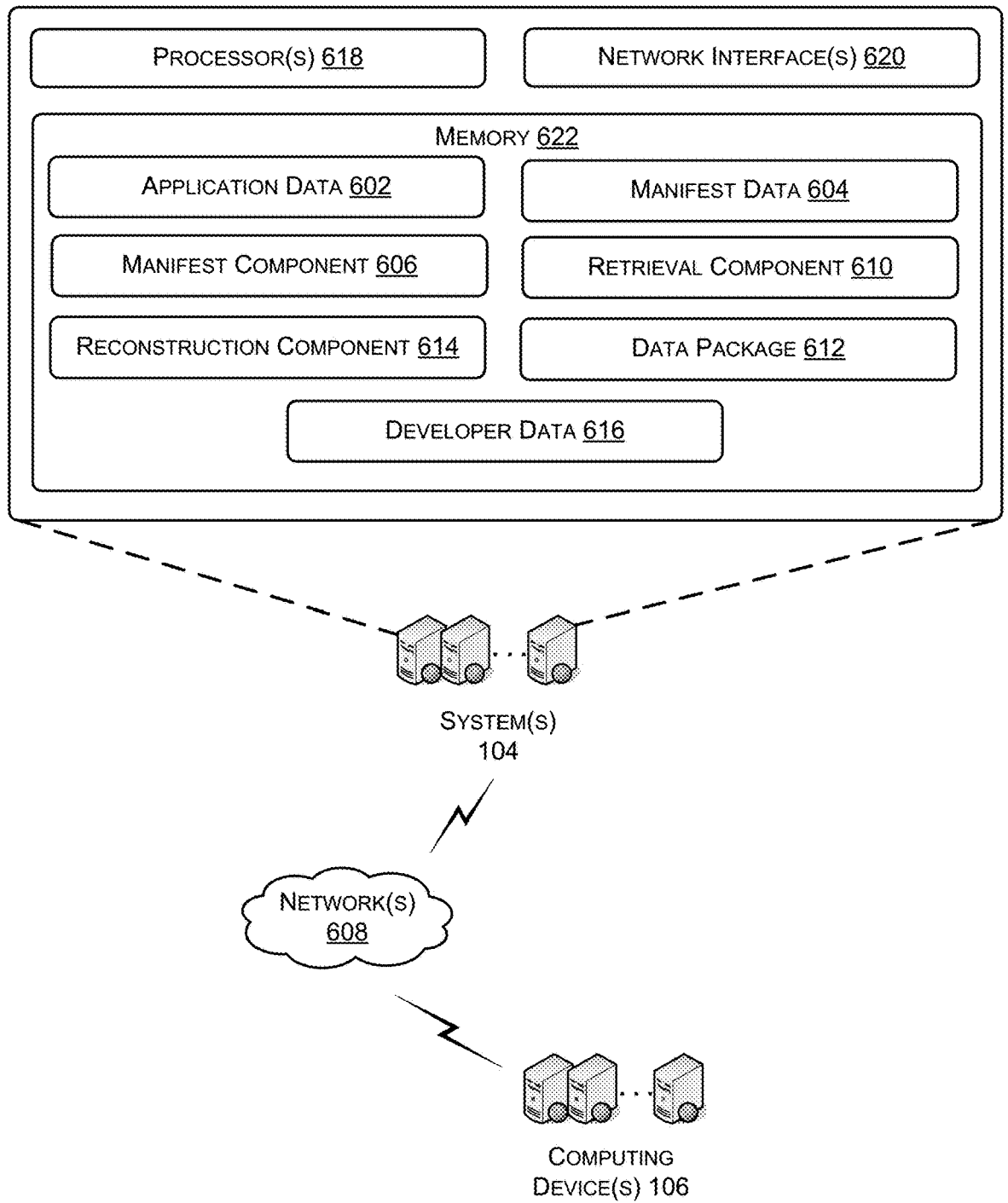
FIG. 6 illustrates a schematic diagram of an example system for uploading network applications, in accordance with examples of the present disclosure.

FIG. 6 illustrates a schematic diagram of an example system 600 for uploading network applications, in accordance with examples of the present disclosure. As shown, the system(s) 104 may store application data 602 representing network applications uploaded by one or more developers. For example, the application data 602 may represent different versions of games that are uploaded by one or more developers. The system(s) 104 also store manifest data 604 representing manifests for the network applications. In some examples, the system(s) 104 store the manifest data 604 in association with the application data 602. For example, the system(s) 104 may store data that associates a manifest, represented by the manifest data 604, with a network application, represented by the application data 602, where the manifest describes the contents of the network application.

The system(s) 104 further store a manifest component 606 that is configured to analyzes the manifests, represented by the manifest data 604, using the processes described herein in order to identify modifications that occurred when creating new versions of network applications. For example, the manifest component 606 may perform the processes described with respect to FIG. 3 in order to determine that the file 208(2) was updated to the file 306 for the new version of the network application. For another example, the manifest component 606 may perform the processes described with respect to FIG. 4 in order to determine that the file 306 has been updated for the new version of the network application. In some examples, the manifest component 606 performs these processes in response to the system(s) 104 receiving a manifest from the computing device(s) 106 via network(s) 608.

The system(s) 104 also store a retrieval component 610 that is configured to retrieve data from the computing device(s) 106, where the retrieval component 610 may retrieve the data using data packages 612. For a first example, if the computing device(s) 106 are uploading a new network application, then the retrieval component 610 may be configured to receive an entirety of the data for the new network application. For a second example, if the computing device(s) 106 are uploading a new version of a network application, where the system(s) 104 already store the data for the previous version of the network application, then the retrieval component 610 may be configured to only receive a portion of the data for the new version of the network application. As described herein, the portion of the data may correspond to the data that was modified in order to create the new version of the network application.

The system(s) 104 also store a reconstruction component 614 that is configured to reconstruct the network application in order to create a new version of the network application. For instance, after receiving updated data for a new version of the network application, the reconstruction component 614 may be configured to use the data associated with the previous version of the network application, the received data for the new version of the network application, and a manifest in order to reconstruct the new version of the network application (e.g., similar to the processes described with respect to FIG. 5).

As further shown, the system(s) 104 may store developer data 616 representing information about various developers of the network applications. For example, the developer data 616 may represent an identifier (e.g., a name) of a developer, network application(s) that are associated with the developer (e.g., network application(s) uploaded by the developer), identifier(s) of devices associated with the developer, (e.g., identifier(s) associated with the computing device(s) the developer uses to upload the network application(s)), and/or any other information.

The system(s) 104 may also include processor(s) 618, network interface(s) 620, and memory 622. As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington. USA; the Windows operating system from Microsoft Corporation of Redmond. Washington. USA; LynxOS as promulgated by Lynx Software Technologies. Inc. of San Jose, California; Operating System Embedded (Enea OSE) as promulgated by ENEA AB of Sweden; and so forth.

Network Interface(s) may enable communication of data between the electronic device and one or more other remote systems, as well as other networked devices. The network interface(s) may include one or more network interface controllers (NICs) or other types of transceiver devices to send and receive messages over the network(s). For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth). IEEE 802.11 (WiFi), or any other PAN message protocol. Furthermore, each of the network interface(s) may include a wide area network (WAN) component to enable message over a wide area network.

Figure 7A:
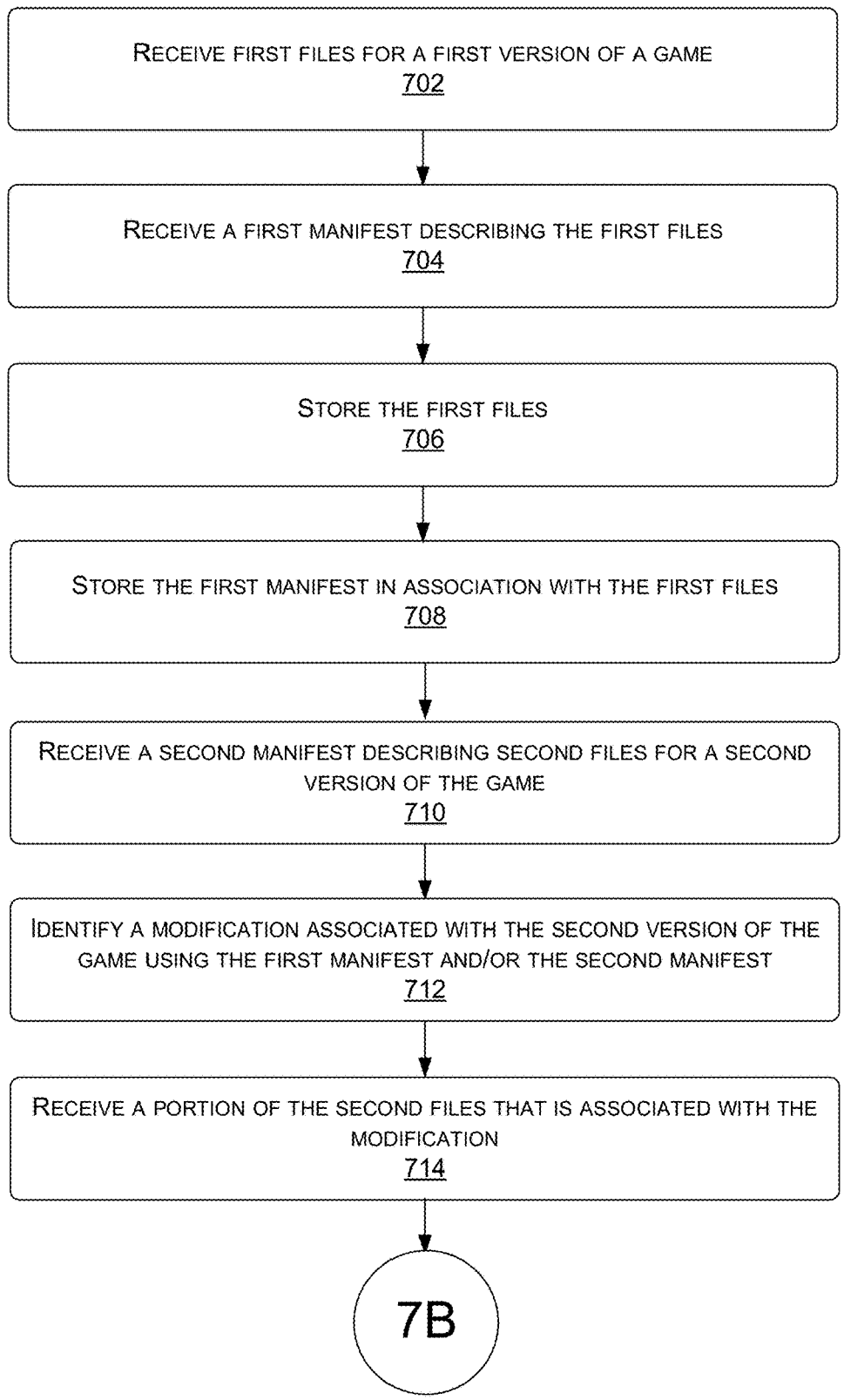
FIGS. 7A-B collectively illustrate an example process for uploading a new version of a game, in accordance with examples of the present disclosure.
Figure 7B:
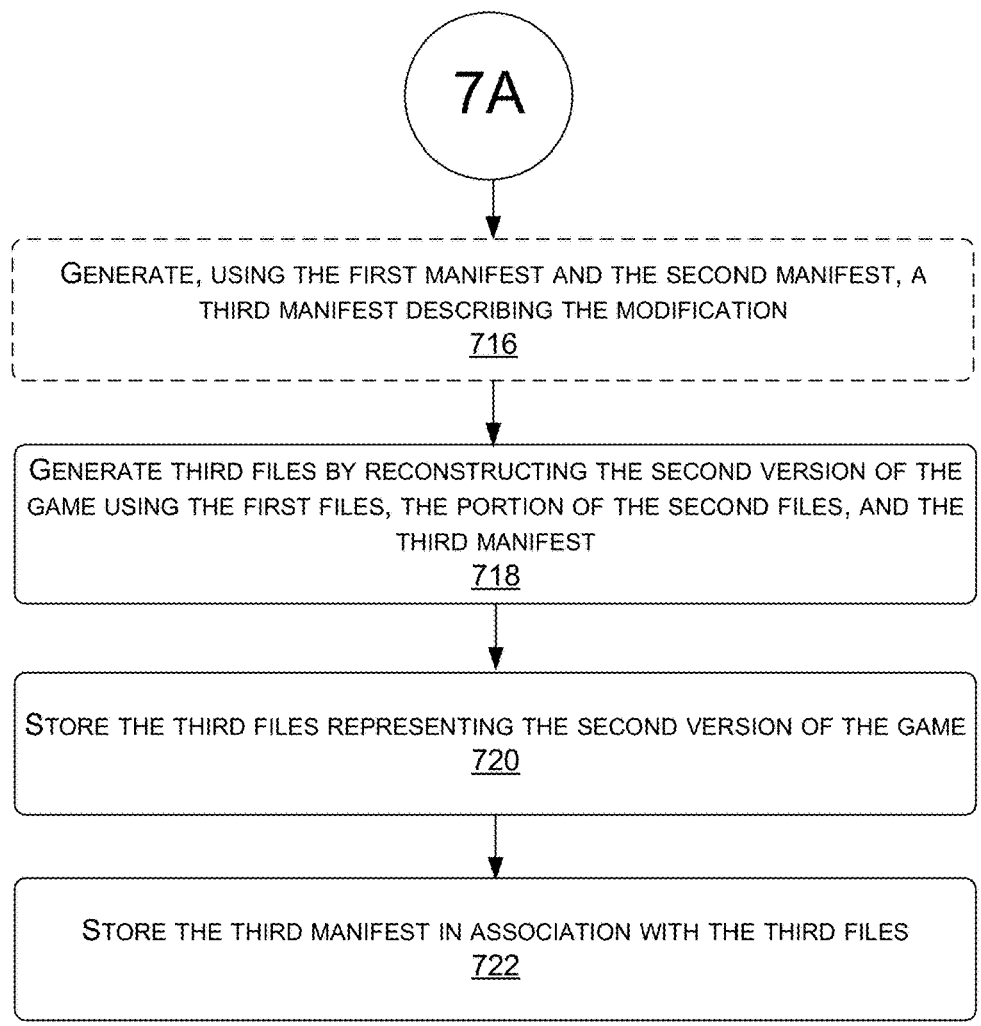
Figure 8:
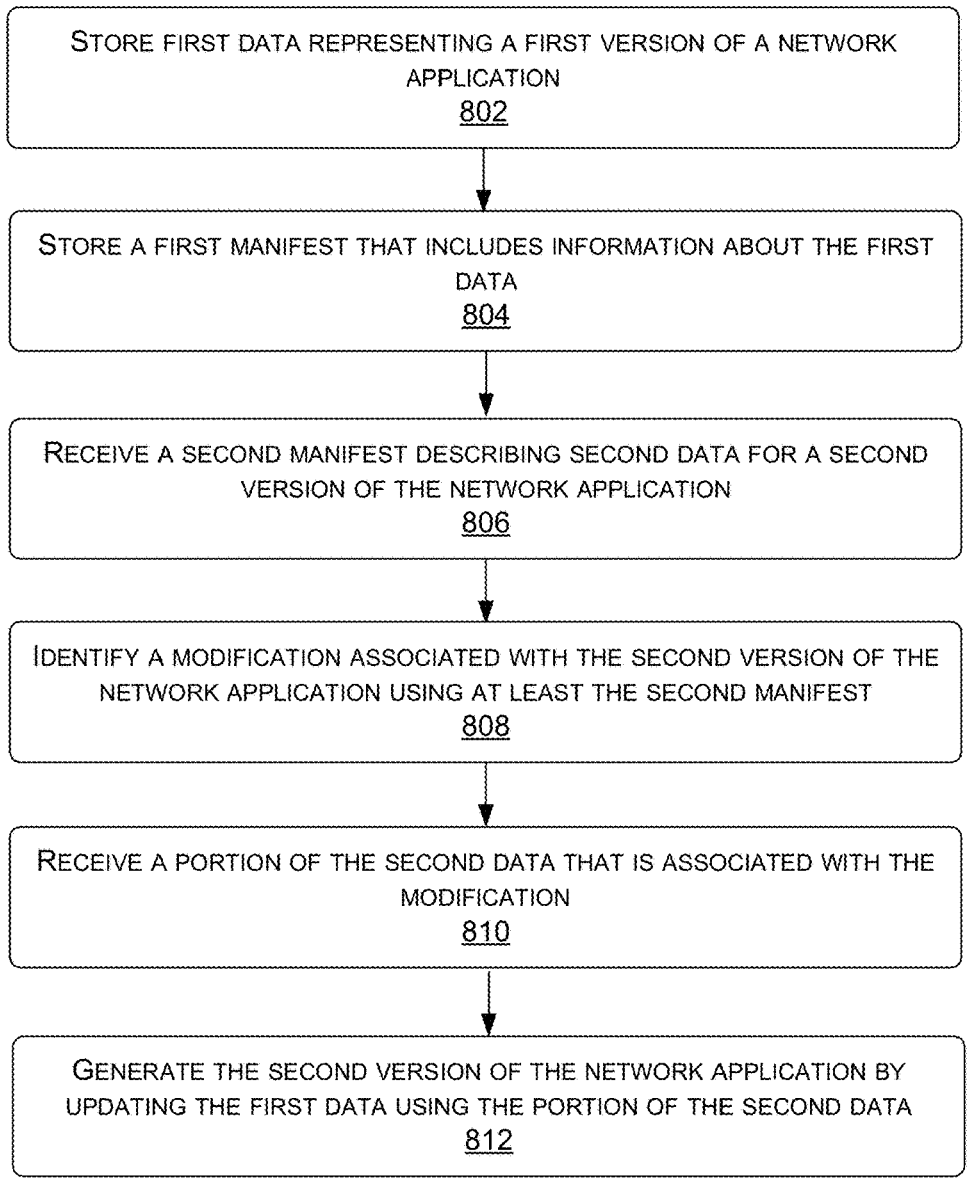
FIG. 8 illustrates an example process for uploading a new version of a network application, in accordance with examples of the present disclosure.

FIGS. 7-8 illustrate various processes for uploading network applications. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIGS. 7A-7B illustrate an example process 700 for uploading a new version of a game, in accordance with examples of the present disclosure. At 702, the process 700 may include receiving first files for a first version of a game and at 704, the process 700 may include receiving a first manifest describing the first files. For instance, the system(s) 104 may receive, from the computing device(s) 104, the first files and the first manifest. As described herein, the first manifest may include a human and/or system readable document that summarizes the file contents and/or other type of data of the first version of the game. For example, the first manifest may include information describing at least the first files, the paths to the first files, the sizes of the first files, hash details for the first files, any updates to the first files, and/or any other information associated with the first version of the game. In some examples, the first manifest includes a specific file format, such as JavaScript Object Notation format, although this is only one example file format for the first manifest.

At 706, the process 700 may include storing the first files and at 708, the process 700 may include storing the first manifest in association with the first files. For instance, the system(s) 104 may store the first files and the first manifest, such as in one or more databases. In some examples, the system(s) 104 store the first manifest in association with the first files. For a first example, the system(s) 104 may store the first manifest in a same database and/or other type of memory as the first files. For a second example, the system(s) 104 may store additional data that identifies the first files, the first manifest, and a link between the first files and the first manifest. In either example, the system(s) may associate the first manifest with the first files so that the system(s) 104 are able to quickly retrieve the first manifest, such as for later analysis.

At 710, the process 700 may include receiving a second manifest describing second files for a second version of the game. For instance, the system(s) 104 may receive the second manifest from the computing device(s) 106. As described herein, in some examples, the second manifest may include information associated with an entirety of the contents of the second version of the game. In other examples, the second manifest may only include information associated with the portion(s) (e.g., file(s)) of the first version of the game that were modified in order to generate the second version of the game. In some examples, the system(s) 104 receive the second manifest in response to the developer of the game attempting to upload the second, updated version of the game.

At 712, the process 700 may include identifying a modification associated with the second version of the game using the first manifest and/or the second manifest. For instance, the system(s) 104 may receive the second manifest from the computing device(s) 106. In examples where the system(s) 104 identify the modification, the second manifest may include an entirety of the information for the files of the second version of the game. As such, the system(s) 104 may retrieve the first manifest from the one or more databases. The system(s) 104 may then analyze the first manifest with respect to the second manifest in order to identify the modification. For example, the system(s) 104 may compare the information (e.g., hashes) for the files described by the first manifest to information (e.g., hashes) for the second files described by the second manifest in order to determine if a hash for a file has changed. Based on identifying a change, the system(s) 104 may determine that the file associated with that hash has been modified. While this is just one example technique of how the system(s) 104 may identify a modification using the manifests, in other examples, the system(s) 104 may use additional and/or alternative techniques.

However, in other examples, the second manifest may only include information associated with the portion(s) (e.g., file(s)) of the first version of the game that were modified in order to generate the second version of the game. In such examples, the system(s) 106 may identify the modification by just analyzing the information included in the second manifest.

At 714, the process 700 may include receiving a portion of the second files that is associated with the modification. For instance, the system(s) 104 may receive the portion of the second files that is associated with the modification. In some examples, the system(s) 104 receive the portion of the second files based on sending, to the computing device(s) 106, a request for the portion of the second data. In some examples, the system(s) 104 receive the portion of the second files using an archive file.

At 716, the process 700 may optionally include generating, using the first manifest and the second manifest, a third manifest describing the modification. For instance, such as when the second manifest includes an entirety of the information for the files of the second version of the game, the system(s) 104 may use the first manifest and the second manifest in order to generate the third manifest describing the modification. For example, the system(s) 104 may generate the third manifest to include the differences between the first manifest and the second manifest. However, in examples where the computing device(s) 106 identify the modification, then the system(s) 106 may not generate the third manifest. Rather, the manifest received from the computing device(s) 106 may correspond to the third manifest. As described herein, the third manifest may be used to reconstruct the second version of the game.

For instance, at 718, the process 700 may include generating third files by reconstructing the second version of the game using the first files, the portion of the second files, and the third manifest. For a first example, the third manifest may indicate that one or more files from the first files have been updated to the portion of the second files. As such, the system(s) 104 may reconstruct the second version of the game by updating the one or more files using the portion of the second files. For a second example, the third manifest may indicate that the portion of the second files includes an expansion for the game. As such, the system(s) 104 may reconstruct the second version of the game by adding the portion of the second files to the first files.

At 720, the process 700 may include storing the third files representing the second version of the game and at 722, the process 700 may include storing the third manifest in association with the third files. For instance, the system(s) 104 may store the third files representing the reconstructed second version of the game, such as in the one or more databases. The system(s) 104 may also store the third manifest in the one or more databases. In some examples, the system(s) 104 store the third manifest in association with the third files and the first manifest. For a first example, the system(s) 104 may store the third manifest in the same database and/or other type of memory as the third files and the first manifest. For a second example, the system(s) 104 may store additional data that identifies the third files, the first manifest, the third manifest, and a link between the third files, the first manifest, and the third manifest.

FIG. 8 illustrates an example process 800 for uploading a new version of a network application, in accordance with examples of the present disclosure. At 802, the process 800 may include storing first data representing a first version of a network application and at 804, the process 800 may include storing a first manifest that includes information about the first data. For instance, the system(s) 104 may receive the first data from the one or more computing device(s) 106. The system(s) 104 may also receive the first manifest from the one or more computing device(s) 106 and/or the system(s) may generate the first manifest using the first data. As described herein, the first manifest may include a human and/or system readable document that summarizes the file contents and/or other type of data of the first version of the network application. For example, the first manifest may include information describing at least the files, the paths to the files, the sizes of the files, hash details for the files, any updates to the files, and/or any other information associated with the first version of the network application.

At 806, the process 800 may include receiving a second manifest describing second data for a second version of the network application. For instance, the system(s) 104 may receive the second data from the computing device(s) 106. As described herein, in some examples, the second manifest may include information associated with an entirety of the contents of the second version of the network application. In other examples, the second manifest may only include information associated with the portion(s) (e.g., file(s)) of the first version of the network application that were modified in order to generate the second version of the network application. In some examples, the system(s) 104 receive the second manifest in response to the developer of the network application attempting to upload the second, updated version of the network application.

At 808, the process 800 may include identifying a modification associated with the second version of the network application using at least the second manifest. For instance, the system(s) 104 may use at least the second manifest in order to identify the modification. In some examples, such as when the second manifest includes the information associated with the entirety of the contents of the second version of the network application, the system(s) 104 may analyze the first manifest with respect to the second manifest in order to identify the modification. For example, the system(s) 104 may compare the information (e.g., hashes) for files described by the first manifest to information (e.g., hashes) for files described by the second manifest in order to determine if a hash for a file has changed. Based on identifying a change, the system(s) 104 may determine that the file associated with that hash has been modified. In other examples, such as when the second manifest only includes the information associated with the portion(s) (e.g., file(s)) of the first version of the network application that were modified in order to generate the second version of the network application, the system(s) 104 may analyze the second manifest to identify the portion(s) that were modified.

At 810, the process 800 may include receiving a portion of the second data that is associated with the modification. For instance, the system(s) 104 may receive the portion of the second data that is associated with the modification. For example, if the modification is to a file, then the portion of the second data may represent the file. In some examples, the system(s) 104 receive the portion of the second data based on sending, to the computing device(s) 106, a request for the portion of the second data.

At 812, the process 800 may include generating the second version of the network application by updating the first data using the portion of the second data. For instance, the system(s) 104 may use the first data and the portion of the second data in order to reconstruct the second version of the game. For a first example, if the modification includes updating a portion (e.g., a file) of the first data with the portion (e.g., a file) of the second data, then the system(s) 104 may reconstruct the second version of the network application by updating the portion of the first data with the portion of the second data. For a second example, if the modification includes expanding the first version of the network application, then the system(s) 104 may reconstruct the second version of the network application by adding the portion of the second data to the first data.

Figure 9:
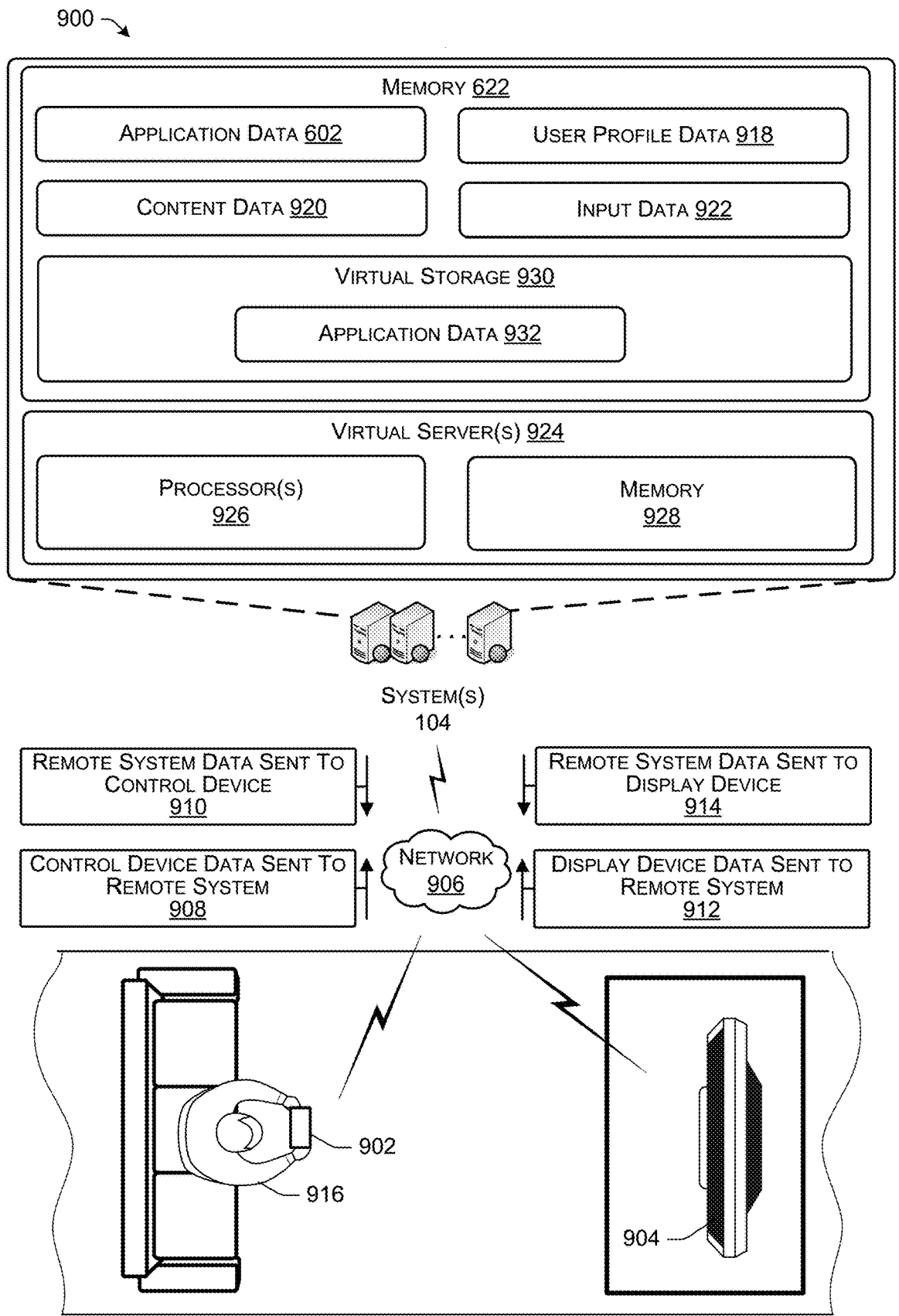
FIG. 9 illustrates a schematic diagram of an example system for controlling network applications, in accordance with examples of the present disclosure.

FIG. 9) is a schematic diagram of an example system 900 for controlling network applications, in accordance with examples of the present disclosure. The system 900 may include, for example, the system(s) 104, a control device 902, and a display device 904. In the example of FIG. 9, the control device 902 may communicate with the system(s) 104 over the network(s) 906, such as by using a first communication channel. For instance, the control device 902 may send data to the system(s) 104 (which is represented by 908) and the system(s) 104 may send data to the control device 902 (which is represented by 910). Additionally, the display device 904 may communicate with the system(s) 104 over the network(s) 906, such as by using a second communication channel. For instance, the display device 904 may send data to the system(s) 104 (which is represented by 912) and the system(s) 104 may send data to the display device 904 (which is represented by 914).

By sending and receiving data with the control device 902 and the display device 904, the system(s) 104 allow a user 916 to control, via the system(s) 104, the network application being displayed by the display device 904 using the control device 902. For instance, the control device 902 may connect to the network(s) 906, such as by using configuration settings. The control device 902 may then send, to the system(s) 104, identifier data representing at least an identifier associated with the control device 902. The system(s) 104 may receive the data and determine, using user profile data 918, that the data is received from the control device 902. For example, the system(s) 104 may match the identifier represented by the data received from the control device 902 with an identifier associated with the user profile data 918. Based at least in part on the match, the system(s) 104 may determine that the data was sent from the control device 902.

The system(s) 104 may further determine, using the user profile data 918, that the control device 902 is associated with at least the display device 904. For example, and based at least in part on determining that the data was sent from the control device 902, the system(s) 104 may analyze the user profile data 918 associated with the user 916. The system(s) 104 may then determine that the user profile data 918 includes and/or is associated with data representing an identifier of the display device 904. Based at least in part on the determination, the system(s) 104 may determine that the control device 902 is associated with the display device 904.

In some instances, the system(s) 104 may then send, to the display device 904, content data 920 (e.g., video data, audio data, etc.) representing one or more network applications that are available to the user 916. In some instances, the one or more network applications may include one or more applications that have been acquired by the user 916 (e.g., the one or more network applications represented by the application data 602). Additionally, or alternatively, in some instances, the one or more network applications may include one or more network applications that are free to users. In either example, the display device 904 may receive the content data 920 from the system(s) 104. The display device 904 may then display image(s) that represent the one or more network applications that are available to the user 916. For example, the image(s) may include one or more identifiers (e.g., one or more names) of the one or more network applications that are available to the user 916.

The system(s) 104 may then receive, from the control device 902, input data 922 representing input(s) received by the control device 902. The system(s) 104 may analyze the input data 922 to identify a network application that is selected by the user 916. For example, the input(s) may correspond to movement(s) of an object, such as a cursor, across the image(s) representing the one or more network applications. The input(s) may further correspond to a selection of one of the network applications (e.g., a selection of a control on the control device 902 when the object is located over the selected network application). The system(s) 104 may then determine, based at least in part on the selection, that the user 916 selected the network application.

The system(s) 104 may then assign the control device 902 and/or the display device 904 with a virtual server 924 associated with the network application. As described herein, the virtual server 924 may include a server (e.g., computer and server programs) that executes at a remote location and is used to run applications. For example, the virtual server 924 may include one or more dedicated computing resources, such as processor(s) 926, memory 928, storage, network capacity, and/or the like, for running and providing the application. As such, the system(s) 104 may install the selected network application on the virtual server 924, either before or after the user 916 selects the network application. Additionally, the system(s) 104 may cause a launching of the network application on the virtual server 924, either before or after the user 916 selects the network application. In some examples, the launching of the network application occurs using the launch file that includes the command(s) associated with launching the network application. Once the network application is launched, the system(s) 104 are able to provide content associated with the network application.

For example, the system(s) 104 may then send, to the display device 904, content data 920 representing a first state of the network application. The content data 920 may include first video data representing image(s) of the first state of the network application, first audio data representing sound corresponding to the first state of the network application, and/or first timestamp data representing a time for displaying the image(s) and/or a time for outputting the sound. The display device 904 may receive the content data 920 from the system(s) 104. Using the first video data, the display device 904 may display the image(s) representing the first state of the network application. For example, if the network application includes a gaming application, the display device 904 may display content representing the first state of the game. In the example of FIG. 9, the first state of the game may include an object (e.g., a character) located at a first position in a gaming environment (e.g., a forest). In some instances, the display device 904 may further output the sound represented by the first audio data.

In some instances, the display device 904 displays the image(s) and/or outputs the sound according to the time(s) represented by the first timestamp data. For example, the display device 904 may determine when a current time includes the time represented by the first timestamp data for displaying the first video data. Based at least in part on the determination, the display device 904 may begin displaying the image(s) representing the first state of the network application. Additionally, the display device 904 may determine when a current time includes the time represented by the first timestamp data for outputting the sound. Based at least in part on the determination, the display device 904 may begin outputting the sound represented by the first audio data.

In some instances, the system(s) 104 may additionally send, to the control device 902, content data 920 representing the first state of the network application. The content data 920 may include second audio data representing sound corresponding to the first state of the network application and/or second timestamp data representing a time for outputting the sound. The control device 902 may then output the sound represented by the second audio data. In some instances, the control device 902 may output the sound according to the time represented by the second timestamp data. In some instances, first timestamp data and/or the second timestamp data synchronizes the outputting of the sound by the control device 902 with the displaying of the image(s) by the display device 904.

The user 916 can then use the control device 902 to provide inputs to the network application. For instance, the control device 902 may receive an input, such as a selection of a button, joystick, key, touch-sensitive pad, sensor, and/or the like associated with the control device 902. The control device 902 may then send, to the system(s) 104, input data 922 representing the input. Using the input data 922, the system(s) 104 may update the first state of the network application to a second state of the network application. For example, and using the example above where the network application includes the gaming application, the input may be associated with moving the object forward by a given amount within the gaming environment. As such, the system(s) 104 may analyze the input data 922 to determine that the input includes moving the object forward by the given amount. The system(s) 104 may then update the first state of the of the network application to the second state of the network application by moving the object forward in the environment by the given amount.

The system(s) 104 may then send content data 920 representing a second state of the network application to the display device 904. The content data 920 may include third video data representing image(s) of the second state of the network application, third audio data representing sound corresponding to the second state of the network application, and/or third timestamp data representing a time for displaying the image(s) and/or a time for outputting the sound. The display device 904 may receive the content data 920 from the system(s) 104. Using the third video data, the display device 904 may display image(s) representing the second state of the network application. For example, and again using the example where the network application includes the gaming application, the display device 904 may display the object located at the second position within the gaming environment. In some instances, the display device 904 may further output the sound represented by the third audio data. In some instances, the display device 904 displays the image(s) and/or outputs the sound according to the time(s) represented by the third timestamp data.

In some instances, the system(s) 104 may additionally send, to the control device 902, content data 920 representing the second state of the network application. The content data 920 may include fourth audio data representing sound corresponding to the second state of the network application and/or fourth timestamp data representing a time for outputting the sound. The control device 902 may then output the sound represented by the fourth audio data. In some instances, the control device 902 may output the sound according to the time represented by the fourth timestamp data. In some instances, third timestamp data and/or the fourth timestamp data synchronizes the outputting of the sound by the control device 902 with the displaying of the image(s) by the display device 904.

In some instances, the system(s) 104 may continue to receive input data 922 from the control device 902. The system(s) 104 may then continue to process the input data 922 in order to update the state of the network application. Based at least in part on the updating, the system(s) 104 may continue to send, to the display device 904, content data 920) (e.g., video data, audio data, timestamp data, etc.) representing the current state of the network application. The system(s) 104 may further send, to the control device 902, content data 920 (e.g., audio data, timestamp data, etc.)

representing the current state of the network application. In other words, the system(s) 104 allow the user 916 to access the network application that is executing on the virtual server 924.

As further illustrated in the example of FIG. 9, the system(s) 104 may store virtual storage device(s) 930. As described herein, a virtual storage device 930 may include a storage volume, such as an EBS, that is stored remotely (e.g., a cloud-based storage) from user devices. In some examples, the system(s) 104 may generate different types of virtual storage devices 930. For example, the system(s) 104 may generate solid-state drives, hard disk drive, and/or any other type of remote storage drives. After the system(s) 104 generate the virtual storage device 930, the system(s) 104 may create a file system on the virtual storage device 930, run a database on the virtual storage device 930, store a network application on the virtual storage device 930 (which is represented by 932), and/or perform one or more additional and/or alternative processes with the virtual storage device 930.

For example, the system(s) 104 may initially store the network applications in one or more memories. In some examples, the one or more memories may be associated with long-term storage of the network applications. In some examples, the system(s) 104 store the network applications in the one or more memories based on the developers uploading the network applications (and/or updates for the network applications). The system(s) 104 may then retrieve a select network application from the one or more memories and store the selected network application on the virtual storage device 930. The system(s) 104 may then use the virtual storage device 930 to install the network application on the virtual server 924. Additionally, in order to provide the network application to multiple users, the system(s) 104 may copy the network application by taking a point-in-time copy of the virtual storage device 930, where the point-in-time copy generates multiple virtual storages devices 930 that each store the network application. The system(s) 104 may then use the virtual storage devices 930 to install the network application on multiple virtual servers 924.

In some examples, the system(s) 104 may include two separate systems, where first system(s) perform the processes described herein in order to upload network applications from developers and store the network applications on the one or more memories. For example, the first system(s) may perform similar processes as the system(s) 104 described with respect to FIG. 6. Second system(s) may then perform the processes described herein in order to provide the network applications to users. For example, the second system(s) may perform similar processes as the system(s) 104 described with respect to FIG. 9.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system comprising:
one or more processors; and
one or more computer-readable media storing instructions that, when executed by the one or more processors, cause the system to perform operations comprising:
receiving, from one or more computing devices associated with a game developer, first files for a first version of a game;
receiving a first manifest describing the first files for the first version of the game, the first manifest including at least:
first information for a first file included in the first files; and
second information for a second file included in the first files;
storing the first files in one or more databases;
storing, in the one or more databases, the first manifest in association with the first files;
receiving, from the one or more computing devices, an indication that the first version of the game has been updated to a second version of the game;
based at least in part on receiving the indication, retrieving the first manifest from the one or more databases;
sending the first manifest to the one or more computing devices;
receiving, from the one or more computing devices, a second manifest describing one or more second files for the second version of the game, the second manifest including at least third information for a third file included in the one or more second files;
receiving the third file from the one or more computing devices; and
reconstructing, using the second manifest, the second version of the game by at least updating the second file using the third file.

2. The system of claim 1, the operations further comprising:
generating a third manifest indicating at least a difference between the first manifest and the second manifest, the third manifest including at least the third information associated with the third file; and
storing, in the one or more databases, the third manifest in association with the first manifest.

3. The system of claim 1, the operations further comprising:
determining, based at least in part on at least one of the first manifest or the second manifest, that the first file has not been modified; and
based at least in part on the first file not being modified, refraining from again receiving the first file from the one or more computing devices.

4. A method comprising:
storing first files associated with a first version of a game;
storing a first manifest describing the first files, the first manifest including at least:
first information for a first file included in the first files; and
second information for a second file included in the first files;

receiving, from one or more computing devices, an indication that the first version of the game has been updated to a second version of the game;

based at least in part on the indication, sending the first manifest to the one or more computing devices;

receiving, from the one or more computing devices, a second manifest describing one or more second files, the one or more second files being associated with the second version of the game, the one or more second files including at least third information for a third file of the one or more second files;

receiving, from the one or more computing devices, the third file associated with a modification to update the game to the second version; and reconstructing, using the second manifest, the second version of the game by at least updating the second file using the third file.

5. The method of claim 4, further comprising:

generating a third manifest indicating at least a difference between the first manifest and the second manifest, the third manifest including information associated with the third file; and storing the third manifest in association with the first manifest.

6. The method of claim 5, wherein generating the third manifest comprises at least:

determining, based at least in part on the third manifest, the information for updating the first files using the third file; and generating the third manifest by updating the first files using the third file.

7. The method of claim 4, wherein the third file is a first file, and wherein generating the third manifest comprises replacing a second file, from the first files, with the first file.

8. The method of claim 4, wherein generating the third manifest comprises adding the third file to the first files.

9. The method of claim 4, wherein the third file is a first file, and wherein generating the third manifest further comprises at least one of:

removing a second file from the first files;

updating a first name of the second file to a second name; or updating a first path associated with the second file to a second path.

10. The method of claim 4, wherein the third file is a first file, and wherein the method further comprises:

determining, based at least in part on the second manifest, that a second file was not modified for the second version of the game; and refraining from receiving the second file from the one or more computing devices.

11. The method of claim 4, wherein:

receiving of indication comprises receiving, from the one or more computing devices, a request to update the first version of the game to the second version of the game; and the method further comprises, based at least in part on receiving the request, retrieving the first manifest from one or more databases.

12. The method of claim 4, wherein:

storing the first files comprises storing the first files using a first data package; and receiving the third file comprises receiving, from one or more computing devices, a second data package that includes at least the third file.

13. The method of claim 4, further comprising:

causing, using at least the third manifest, an installation of the second version of the game on a virtual server;

receiving, from a user device, a request associated with the game;

based at least in part on receiving the request, causing a launching of the game on the virtual server; and sending, to the user device, content data representing a state of the game.

14. A system comprising:

one or more processors; and one or more computer-readable media storing instructions that, when executed by the one or more processors, cause the system to perform operations comprising:

storing first files associated with a first version of a game;

storing a first manifest describing the first files, the first manifest including at least:

first information for a first file included in the first files; and second information for a second file included in the first files;

receiving a second manifest describing one or more second files, the one or more second files including third information for a third file associated with a second version of the game;

determining, based at least in part on the second manifest, that at least a first file, from the first files, has been modified to create the second version of the game;

based at least in part on the first file being modified, receiving, from one or more computing devices, a third file from the one or more second files; and reconstructing, using the second manifest, the second version of the game by at least updating the second file using the third file.

15. The system of claim 14, wherein determining that the first file has been modified comprises:

determining that the first manifest includes first information associated with the first file;

determining that the second manifest does not include the first information associated with the first file; and determining that the second manifest includes second information associated with the second file.

16. The system of claim 14, wherein determining that the first file has been modified comprises:

determining that the first manifest includes first information associated with the first file;

determining that the second manifest includes second information associated with the second file;

determining that the second information is different than the first information; and based at least in part on the second information being different than the first information, determining that the first file was modified in order to create the second file.

17. The system of claim 14, the operations further comprise:

determining that the first manifest includes first information associated with a third file from the first files;

determining that the second manifest includes second information associated with the third file;

determining that the second information is similar to the first information;

based at least in part on the second information being similar to the first information, determining that the third file was not modified for the second version of the game; and refraining from receiving the third file from the one or more computing devices.

18. The system of claim 17, wherein:

the first information comprises a first hash;

the second information comprises a second hash; and determining that the second information is similar to the first information comprises determining that the second hash matches the first hash.

19. The system of claim 14, the operations further comprising storing the second manifest in association with the first manifest.

20. The system of claim 14, the operations further comprising:

generating a third manifest indicating at least a difference between the first manifest and the second manifest, the third manifest including information associated with the second file; and storing the third manifest in association with at least the first manifest.

* * * * *